(12) United States Patent
Hart et al.

(10) Patent No.: US 9,032,122 B2
(45) Date of Patent: May 12, 2015

(54) FUNCTION TRANSFER USING VIRTUALIZED MAPPING

(71) Applicant: International Business Machines Corporation, Armonk, NY (US)

(72) Inventors: Brian W. Hart, Austin, TX (US); Liang Jiang, Austin, TX (US); Anil Kalavakolanu, Austin, TX (US); Shannon D. Moore, Pflugerville, TX (US); Robert E. Wallis, Austin, TX (US); Evelyn T. Yeung, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/101,398

(22) Filed: Dec. 10, 2013

(65) Prior Publication Data

US 2015/0052281 A1 Feb. 19, 2015

Related U.S. Application Data

(63) Continuation of application No. 13/969,664, filed on Aug. 19, 2013.

(51) Int. Cl.
*G06F 9/455* (2006.01)
*G06F 13/28* (2006.01)
*G06F 13/16* (2006.01)

(52) U.S. Cl.
CPC .............. *G06F 13/28* (2013.01); *G06F 13/16* (2013.01); *G06F 9/45533* (2013.01)

(58) Field of Classification Search
None
See application file for complete search history.

(56) References Cited

U.S. PATENT DOCUMENTS

| | | | |
|---|---|---|---|
| 7,334,071 B2 * | 2/2008 | Onufryk et al. | 710/312 |
| 7,506,084 B2 * | 3/2009 | Moerti et al. | 710/52 |
| 7,587,575 B2 * | 9/2009 | Moertl et al. | 711/206 |
| 7,937,518 B2 | 5/2011 | Boyd et al. | |
| 7,958,298 B2 * | 6/2011 | Deshpande et al. | 710/310 |
| 7,984,454 B2 | 7/2011 | Freimuth et al. | |
| 8,041,871 B2 * | 10/2011 | Deshpande et al. | 710/310 |
| 8,412,863 B2 * | 4/2013 | Tanaka et al. | 710/20 |
| 8,533,713 B2 * | 9/2013 | Dong | 718/1 |
| 8,561,066 B2 * | 10/2013 | Koch et al. | 718/1 |
| 8,725,919 B1 * | 5/2014 | Zhu et al. | 710/104 |

(Continued)

OTHER PUBLICATIONS

'PCI-SIG SR-IOV Primer—An Introduction to SR-I0V Technology' Intel LAN Access Division, revision 2.5, Jan. 2011.*

(Continued)

*Primary Examiner* — Steven Snyder
(74) *Attorney, Agent, or Firm* — Scott S. Dobson; Thomas E. Tyson

(57) ABSTRACT

The present disclosure includes a method for migration of a first virtual function of a first device located on a PCI bus and accessible by a device driver using a virtual address. A second virtual function is created on a second device. A base address is determined for the second virtual function as a function of a logical location of the second device within the PCI structure. An offset is determined for the second virtual function as a function of the base address and the virtual address. The device driver is notified that the first virtual function is on hold. The offset is stored in a translation table. The device driver is notified that the hold has been lifted. Accesses to the virtual address and by the device driver to memory of the second virtual function are routed based upon the offset in the translation table.

11 Claims, 8 Drawing Sheets

(56) References Cited

U.S. PATENT DOCUMENTS

| | | | |
|---|---|---|---|
| 8,769,168 B2 * | 7/2014 | Moertl et al. | 710/52 |
| 8,819,235 B2 * | 8/2014 | Cardona et al. | 709/226 |
| 2006/0224790 A1 | 10/2006 | Arndt et al. | |
| 2006/0282603 A1 * | 12/2006 | Onufryk et al. | 710/312 |
| 2008/0091855 A1 * | 4/2008 | Moertl et al. | 710/52 |
| 2008/0091915 A1 * | 4/2008 | Moertl et al. | 711/206 |
| 2008/0092148 A1 * | 4/2008 | Moertl et al. | 719/321 |
| 2008/0148005 A1 * | 6/2008 | Moertl et al. | 711/202 |
| 2008/0189720 A1 * | 8/2008 | Moertl et al. | 719/314 |
| 2009/0025007 A1 * | 1/2009 | Hara et al. | 718/105 |
| 2009/0100204 A1 | 4/2009 | Boyd et al. | |
| 2010/0122124 A1 | 5/2010 | Chen et al. | |
| 2011/0029973 A1 * | 2/2011 | Hara et al. | 718/1 |
| 2011/0179214 A1 * | 7/2011 | Goggin et al. | 711/6 |
| 2012/0042034 A1 * | 2/2012 | Goggin et al. | 709/216 |
| 2012/0096192 A1 * | 4/2012 | Tanaka et al. | 710/20 |
| 2012/0124572 A1 * | 5/2012 | Cunningham et al. | 718/1 |
| 2012/0159481 A1 * | 6/2012 | Anderson et al. | 718/1 |
| 2012/0297379 A1 * | 11/2012 | Anderson et al. | 718/1 |
| 2013/0254321 A1 * | 9/2013 | Johnsen et al. | 709/212 |
| 2013/0254368 A1 * | 9/2013 | Guay et al. | 709/223 |
| 2013/0254404 A1 * | 9/2013 | Johnsen et al. | 709/226 |
| 2014/0130040 A1 * | 5/2014 | Lemanski | 718/1 |
| 2014/0173600 A1 * | 6/2014 | Ramakrishnan Nair | 718/1 |
| 2014/0173628 A1 * | 6/2014 | Ramakrishnan Nair | 718/108 |
| 2014/0181807 A1 * | 6/2014 | Fonseca et al. | 718/1 |
| 2014/0189690 A1 * | 7/2014 | Ramakrishnan Nair | 718/1 |

OTHER PUBLICATIONS

'Standardized but flexible I/0 for self-virtualizing devices' by LeVasseur et al., WIOV'08 Proceedings of the First conference on I/O virtualization, 2008.*

'Best Practices Guide: Emulex Virtual HBA Solutions and VMware ESX Server 3.5' by VMware and Emulex, copyright 2007.*

Anonymous "Supporting Migration of Virtual Machines Running Mulit-Tier Applications in Computing Clouds that Span Multiple IP Address Ranges", IP.com Prior Art Database. Published Aug. 19, 2010. pp. 1-6. IP.com No. IPCOM000198971D. © IP.com.

Hart et al., "Function Transfer Using Virtualized Mapping," U.S. Appl. No. 13/969,664, filed Aug. 19, 2013.

IBM "Automating Virtual Machine Migration in a SAN Environment", IP.com Prior Art Database. Published Mar. 10, 2009. IP.com No. IPCOM000180464D. © IP.com.

IBM "Method for Virtual SCSI Adapter Assignment During Partition Migration", IP.com Prior Art Database. Published Jun. 5, 2009. IP.com No. IPCOM000183927D. © IP.com.

Unknown, "Page Replacement Algorithm," Wikipedia, http://en.wikipedia.org/wiki/Page_replacement_algorithm Page Last Modified on Mar. 14, 2013. at 17:29.

* cited by examiner

FUNCTION TRANSFER USING VIRTUALIZED MAPPING

CROSS-REFERENCE TO RELATED APPLICATIONS

This application is a continuation of co-pending U.S. patent application Ser. No. 13/969,664 filed on Aug. 19, 2013. The aforementioned related patent application is herein incorporated by reference in its entirety.

FIELD

This disclosure relates to virtual function migration. In particular, it relates to facilitating the migration of virtual functions between different devices of a computer system.

BACKGROUND

Peripheral Component Interconnect (PCI) busses allow for communications between central processing units (CPUs) and other system components, such as input/output (I/O) devices. PCI device adapters provide interfaces between system components and the PCI busses. PCI bridges provide interfaces between a PCI bus and either another PCI bus (in the case of a PCI-to-PCI bridge) or another type of bus (e.g., a processor side bus). Device drivers control how software applications are allowed to access the various I/O devices and the corresponding PCI adapter devices. This control can include the management and access to PCI configuration space for the various adapter devices.

Certain PCI adapter devices, such as those compliant with versions of PCI-express (PCIe), allow for the creation and use of virtual functions. These virtual functions can, for instance, be used to allow for multiple device drivers to share access to a common physical function or device.

SUMMARY

Aspects of the present disclosure are directed to computer systems designed for the migration of virtual PCI functions among PCI devices, and methods of using such systems, that address challenges including those discussed herein, and that are applicable to a variety of applications. These and other aspects of the present disclosure are exemplified in a number of implementations and applications, some of which are shown in the figures and characterized in the claims section that follows.

In certain embodiments of the present disclosure, virtual PCI functions can be migrated in a manner that is substantially transparent to device drivers. For instance, a device driver can continue to use the same PCI bus number, function number and address range for a particular virtual function both before and after a migration. This can be accomplished by assigning a virtual PCI bus to each virtual function and by performing a translation that can include mapping each virtual PCI bus to real PCI busses and adapters and can also include the use of address offsets to accommodate direct memory access (DMA) to main memory. Consistent with various embodiments, these translations can occur in one or more of a hypervisor, a PCI Bridge, a PCI adapter device, a host operating system and combinations thereof.

Various embodiments of the disclosure are directed toward a method for the migration of a first virtual function of a first device that is located on a PCI bus and that is accessible by a device driver using a virtual address. A second virtual function is created on a second device. A base address is determined for the second virtual function as a function of a logical location of the second device within the PCI structure. An offset is determined for the second virtual function using both the base address and the virtual address. The device driver is notified that the first virtual function is on hold. The offset is stored in a translation table. The device driver is then notified that the hold has been lifted. Accesses to the virtual address (and by the device driver to memory of the second virtual function) are routed based upon the offset in the translation table.

Embodiments are directed toward a method for assigning virtual addresses to functions of devices accessible using PCI busses. The method includes assigning similar functions of a common PCI device to separate and different virtual PCI busses respectively. A common virtual address range is assigned to the similar functions. For each of the similar functions, an offset address is mapped between the common virtual address range and a true address of a respective, similar function. From a driver module, an access request is received that identifies the common virtual address range and a virtual PCI bus of the different virtual PCI busses. The offset address, which is mapped to the function corresponding to the received virtual PCI bus, is also applied to the common virtual address range.

Various embodiments are directed toward a system that includes a main memory and a plurality of PCI adapter devices having virtual functions with DMA capabilities to allow access to the main memory. A plurality of PCI Bridges provides access to corresponding real PCI busses upon which the plurality of PCI adapter devices resides. The real PCI busses have real PCI bus numbers. A plurality of virtual machines each have one or more device drivers configured to manage access to the virtual functions using a separate and different virtual PCI bus for each of the virtual functions, and a common address range for each of the virtual functions. One or more hypervisors are configured to translate the separate and different virtual PCI busses to the real PCI bus numbers. A memory stores offset values relative to the common address range and a mapping of each virtual function to a distinct location in the main memory.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments of the disclosure and do not limit the disclosure.

Figure 1:
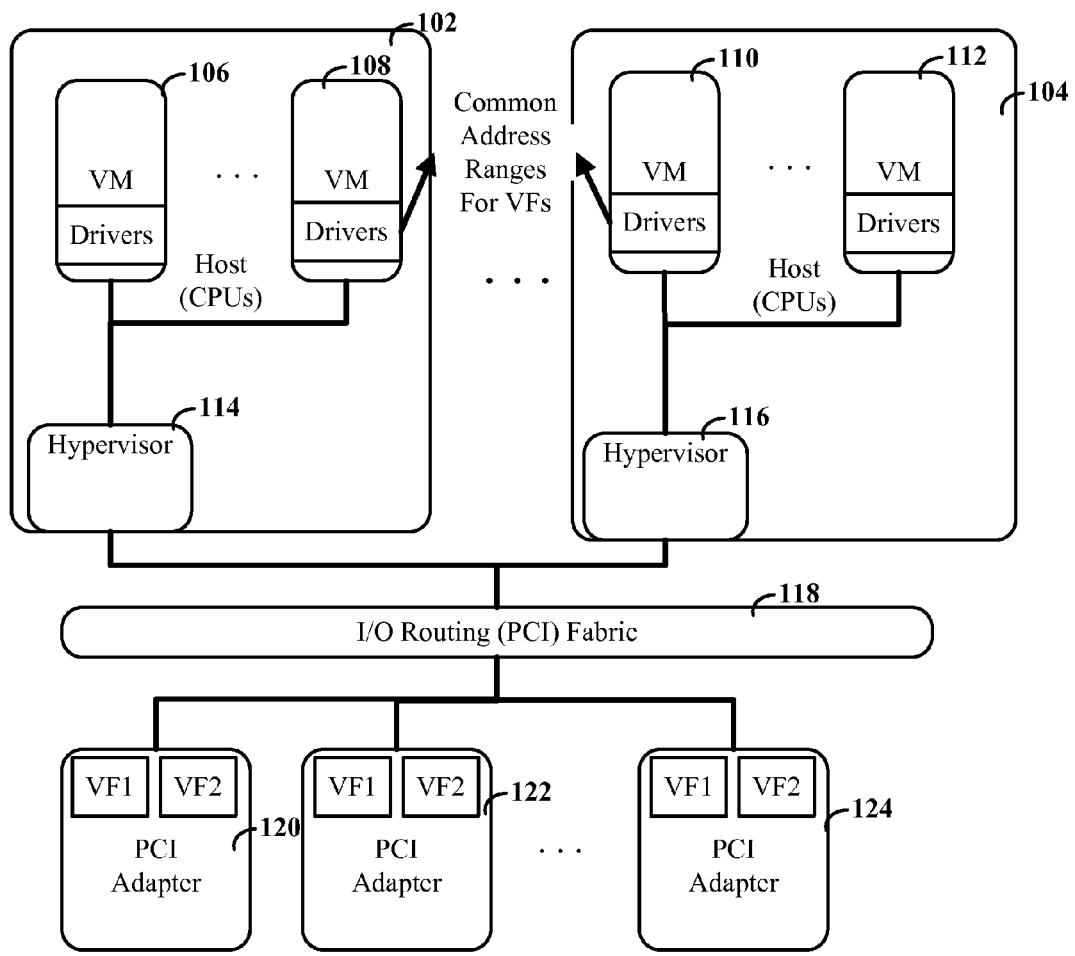
FIG. 1 depicts a block diagram of a system configured to facilitate the migration of virtual functions (VFs), consistent with embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to facilitating the migration of virtual functions, more particular aspects relate to address mapping as it relates to migrating virtual functions between different I/O devices. While the present disclosure is not necessarily limited to such applications, various aspects of the disclosure may be appreciated through a discussion of various examples using this context.

Embodiments of the present disclosure are directed toward the migration of virtual functions of a first device to virtual functions of another device. Consistent with various embodiments, the system can facilitate the migration by mitigating adverse affects to a driver that has already been configured to interface with the original virtual function. For instance, the driver can be configured to access the virtual function using a virtual address range and identifying information for the physical device providing the virtual function. An offset can be used to translate the virtual address to a real address for the virtual function. Moreover, a virtual physical identifier can also be used to decouple the driver from the true physical address. The use of such virtual mapping solutions can be particularly useful for allowing a second device to assume the functional aspects of the first device (e.g., where the first device is experiencing problems or for other reasons). For instance, a second virtual function can be created on the second device that is similar to the first virtual function. A base address for the second virtual function is used to determine an offset. The offset can then be used to translate between the virtual address of the first virtual function and the base address of the second virtual function.

Consistent with various embodiments, the device driver can be notified that the first virtual function is on hold or otherwise inaccessible. The determined offset can then be stored in a memory, which can hold a translation table for various devices and their virtual functions. Other configurations are also possible, as discussed in more detail herein. The device driver can then be notified that the hold has been lifted. Subsequent accesses to the virtual address (which was previously assigned to the first virtual function) can be routed to the second virtual function based upon the new offset in the translation table.

Consistent with embodiments of the present disclosure, the offset translation can be carried out by a hypervisor, an adapter device, the operating system and combinations thereof. Various embodiments are directed toward a system that allows the device driver to resume operation as if the migration had not occurred, e.g., by maintaining the same virtual address between the two virtual functions.

Particular aspects of the present disclosure are directed toward the migration of virtual functions located on adapter devices residing on one or more Peripheral Component Interconnect (PCI) busses. More particular embodiments are directed toward devices residing on one or more PCI express (PCIe) busses. Various embodiments are directed toward devices that are configured to use input/output virtualization (IOV), whether for single root (SR) or multiple root (MR) IOV.

Consistent with various embodiments discussed herein, PCI can allow for up to 256 addressable physical functions per device (e.g., using the alternative routing-ID interpretation which merges the device and function ID bits). SR-IOV can use address translation services that provide an interface to translate DMA addresses to host addresses and define an address translation cache (ATC) for devices to cache these DMA translations.

Each physical device may have one or more physical functions (PFs). SR-IOV can allow a system to handle the configuration and management of one or more virtual functions for the PFs. A VF can use a simplified configuration space by, for instance, sharing the device type of the PF. A hypervisor can assign PCI functions to various virtual machines (VMs). These functions can include one or more VFs.

Aspects of the present disclosure are directed toward facilitating the migration of VFs within a computer system, which may have multiple VMs. This migration can be accomplished by assigning VFs to a virtual PCI bus that is substantially independent of the physical hardware. The translation of the virtual address range used by the virtual PCI bus, to the real address range used by the adapter function, can be accomplished according to various methods and system configurations, some of which are described in more detail herein.

Various embodiments of the present disclosure are directed toward the grouping of VFs into function sets and moving VFs of a set together. For instance, if multiple VFs are associated with a common physical device, they might be grouped into a function set. The physical device could be a PCI adapter device, or it could be another device, such as a storage device that is accessible through multiple VFs. If one of the VFs is selected for migration, the system can be configured to perform a migration of the other VFs in the same function set. This can be particularly useful for situations where the migration requests can be triggered by system events that affect multiple VFs, such as the failure of one or more physical devices having multiple VFs or the transfer of an entire VM from one computer system to another.

Various embodiments are directed toward systems that include an input/output memory management unit (IOMMU). An IOMMU provides memory management for DMA-capable I/O devices, thereby allowing direct access to main memory. An IOMMU can manage the mapping of virtual addresses to physical addresses. For instance, a Translation Control Entry (TCE) can be used to translate addresses generated by I/O devices into physical addresses (e.g., using a TCE table that includes address translations). Accordingly, aspects of the present disclosure are directed toward offsets that can be used by a PCI bridge or a hypervisor before accessing a corresponding TCE table.

Turning now to the figures, the various figures provide support for a variety of embodiments and configurations. Unless otherwise stated, embodiments of the various figures can be used alone or in combination with one another. Similar elements of the figures may be useful for understanding additional details and the various embodiments, but they do not necessarily limit the figures to such embodiments.

FIG. 1 depicts a block diagram of a system configured to facilitate the migration of VFs, consistent with embodiments of the present disclosure. The system of FIG. 1 can include one or more hosts, each of which can include sets of central processing units (CPUs), 102 and 104. For instance, the system can include a number of different servers or server blades that can be used as part of a large server deployment. Other combinations of CPUs and hardware are also contemplated.

The system can also be configured to provide for a plurality of virtual machines (VMs) 106, 108, 110 and 112. The number of VMs can vary according to the particular application and use(s) of the system. One or more hypervisors (or virtual machine managers) 114 and 116 can manage communications from the VMs 106-112 to external resources. This management can facilitate the running of multiple operating systems on shared hardware (e.g., hosts or CPUs 102, 104). The hypervisors 114, 116 can provide the different instances of operating systems with access to the memory, processor(s) and other resources of the hosts 102, 104. For instance, the hypervisors 114, 116 can control the host processor and resources in order to allocate what is needed by the VMs 106-112. Consistent with embodiments, the hypervisors 114, 116 can be type I (running directly on the host's hardware) or type II (running within an operating system).

VMs 106-112 can include one or more software device drivers (or just "drivers"). The drivers can allow other software applications to be provided with access to one or more virtual functions VFs. The VFs can be linked to physical PCI adapter devices 120, 122 and 124. For instance, each of the PCI adapter devices 120, 122 and 124 can provide one or more VFs (e.g., VF1, VF2, etc.). Access to the VFs by the drivers can be accomplished by reading or writing to a particular address range that has been reserved for the VFs. An access request from the driver is then sent to the appropriate PCI adapter and corresponding VF using I/O routing fabric 118. Particular embodiments of the present disclosure contemplate I/O routing fabric 118 including a variety of different PCI busses and bridges, each mapped within I/O space and according to a corresponding PCI bus numbering solution.

As denoted by the arrows, embodiments of the present disclosure are directed toward the use of common address ranges for different VFs. This can be particularly useful for the migration of a VF from one physical function or adapter device to another. For instance, VFs with similar functions can be assigned to different virtual PCI busses, while each still has a common address range. The hypervisor 114 or 116 can apply address offsets to translate the access requests from the drivers to base addresses of the physical devices and corresponding VFs operating therein. These types of offsets can also be used by an operating system and the PCI adapters 120-124.

According to embodiments of the present disclosure, a migration of a particular VF can include pausing accesses to the particular VF, followed by assigning the corresponding virtual bus to a new VF with a similar address range. The offset for the particular VF can then be modified to account for the logical location of the new VF, which may or may not reside on a different PCI bus, a different physical device or a different PCI adapter.

Figure 2:
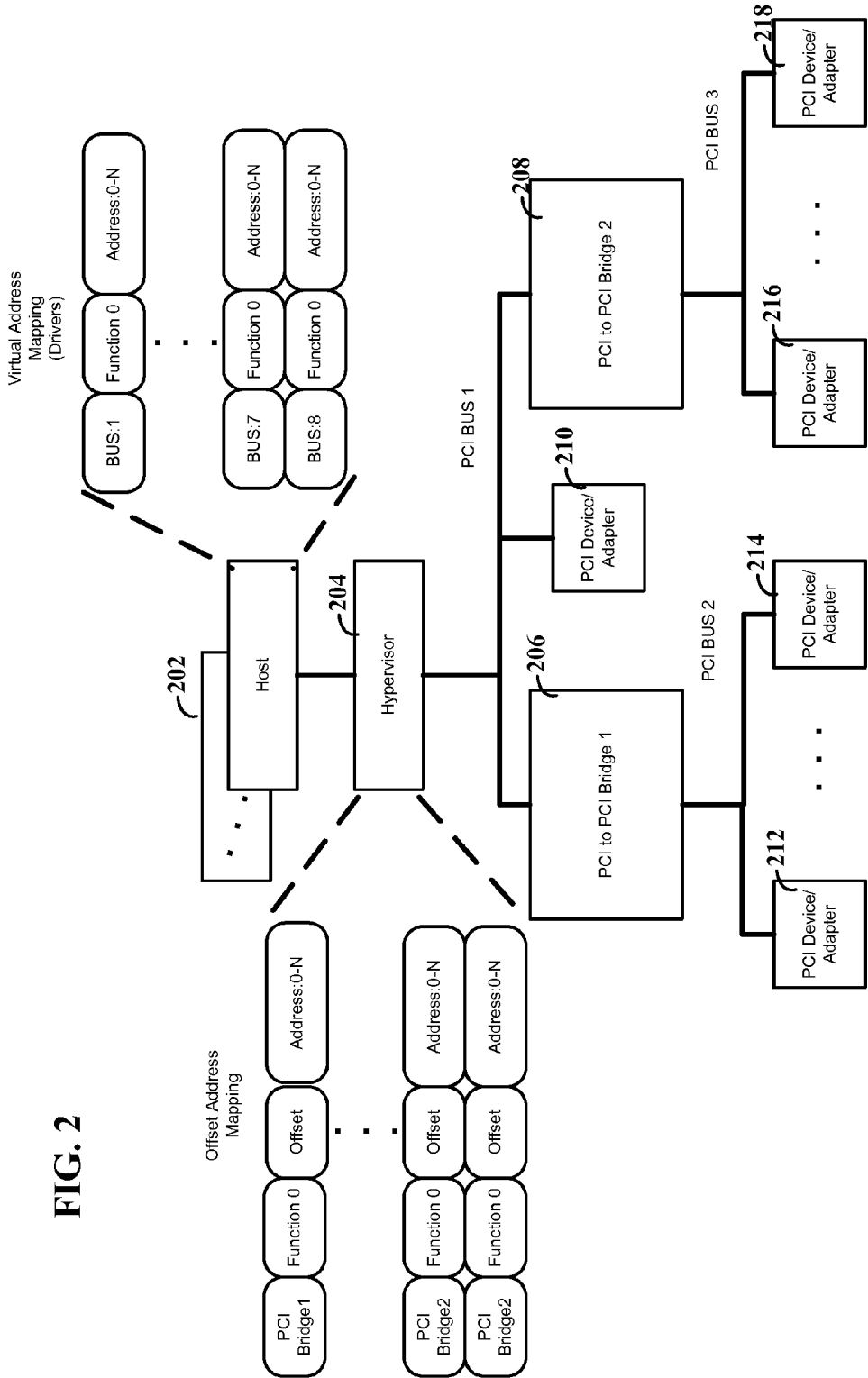
FIG. 2 depicts a block diagram showing logical mappings between devices in a computer system, consistent with embodiments of the present disclosure.

FIG. 2 depicts a block diagram showing logical mappings between devices in a computer system, consistent with embodiments of the present disclosure. The depicted system includes one more hosts 202. As discussed herein, the hosts 202 can provide for a plurality of VMs, which can be managed by one or more hypervisors 204.

For instance, the hypervisor(s) 204 can manage access to devices that are accessible in PCI busses 1, 2 or 3. Access to PCI busses 2 and 3 can be provided through PCI to PCI bridges 206 and 208. Each PCI bus can be assigned a corresponding number (e.g., during the enumeration process) that is used to route data to and from PCI devices/adapters 210, 212, 214, 216 and 218. Each of the PCI devices/adapters 210-218 can provide one or more VFs. In certain embodiments, the PCI devices/adapters 210-218 can be configured to use input/output virtualization (IOV).

As shown in FIG. 2, the various functions of the PCI devices/adapters 210-218 can each be mapped to separate and distinct virtual PCI busses. Also shown in FIG. 2, this virtual mapping of separate PCI busses can be particularly useful for allowing for the use of common function names and address ranges for different VFs. For instance, each VF can be mapped to function 0 and to an address range of 0 to N.

Consistent with certain embodiments of the present disclosure, the hypervisor 204 can use the virtual bus number to find an address offset for a particular function and to ascertain the true (base address) location of the VF within the logical PCI structure. The PCI bridges can also use the address offsets to manage DMA accesses. Various embodiments are directed toward the operating system and the PCI devices/adapters 210-218 managing the address offset for VFs and thereby offloading this management from the hypervisor and PCI bridges.

Figure 3:
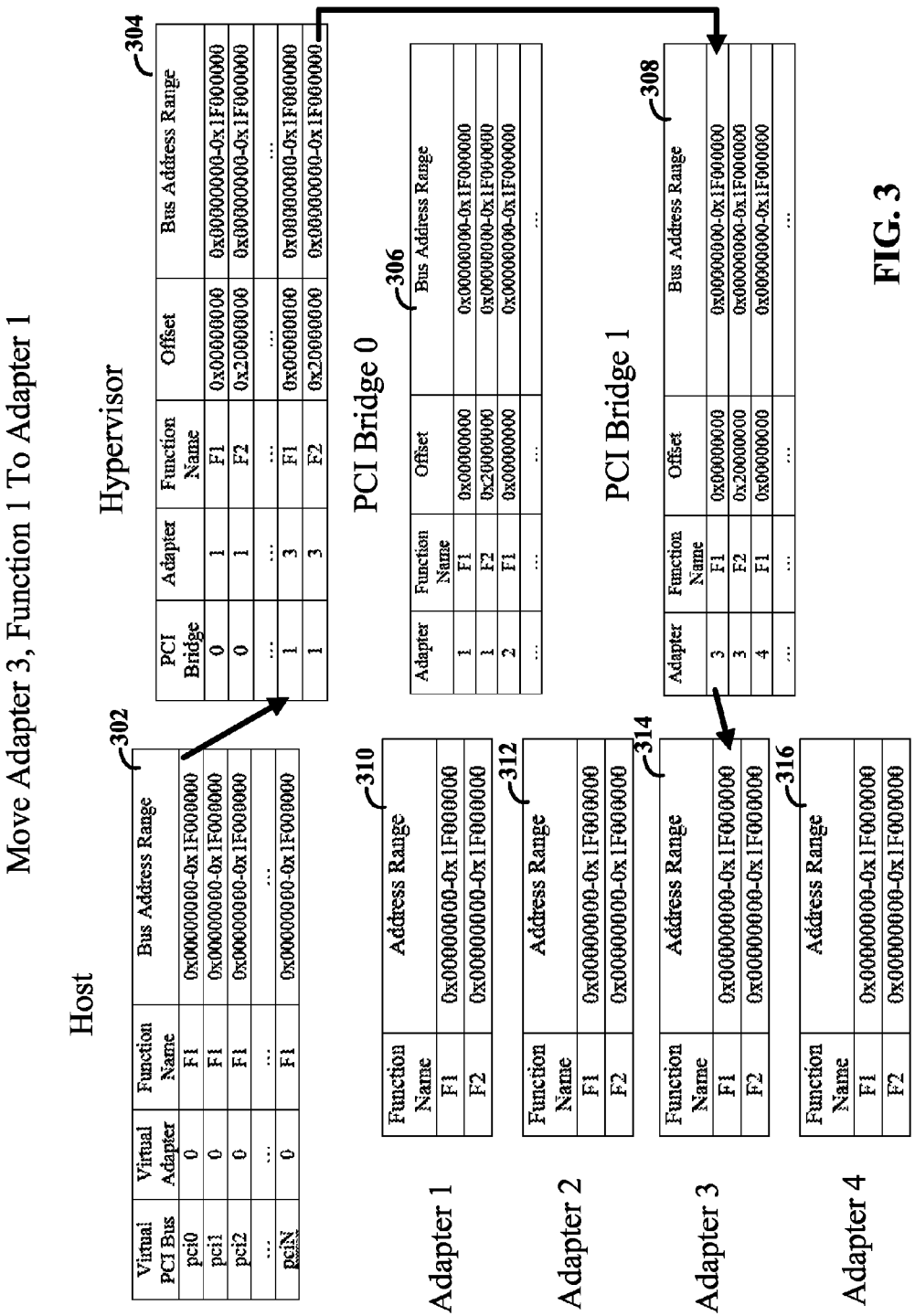
FIG. 3 depicts an address mapping, prior to migration of a VF, in which a hypervisor manages address offsets, consistent with embodiments of the present disclosure.

FIG. 3 depicts an address mapping, prior to migration of a function, in which a hypervisor manages address offsets, consistent with embodiments of the present disclosure. The address mapping shown in host table 302 provides an example of VF mapping as seen by a device driver of an operating system running on a host system. Each of the similar functions can be mapped to a separate virtual PCI bus (e.g., pci0, pci1, pci2 ... pciN). This use of virtual PCI bus mapping can be useful for allowing the use of common bus address ranges (e.g., 0x00000000-0x1F000000), common function names (e.g., F1) and common virtual adapter numbers (e.g., 0).

In order to communicate between the device driver and the various functions, the hypervisor 304 can translate between the virtual bus mapping 302 and the actual, base address, for the various adapters (1-4). For instance, the virtual PCI bus "pci0" is shown as being mapped to PCI bridge 1, adapter 3, function F1. The hypervisor can also be configured and arranged to use an address offset that can be based upon the virtual PCI bus and base address for the particular function. The hypervisor can use a lookup table to translate between these two addresses, one of which uses the virtual PCI buses and the other that maps to a particular PCI bridge.

As shown in PCI bridge tables 0 and 1, the address offset can also be stored within (or be accessible by) the PCI bridges. This facilitates the use of common address ranges by each of the PCI adapters (1-4) and their corresponding virtual functions, as shown by tables 310, 312, 314 and 316.

As discussed herein, the use of offsets can be particularly useful for managing direct memory access (DMA) by the adapters and device drivers. For instance, the physical range for a particular function could begin at 0xKxxxxxxxx. The hypervisor can be used to program a base mapping register in the bridge to map the function to 0xKxxxxxxxx. If driver requests to map page 0x0 of the particular function, the hypervisor can write an entry 0xK0000000 into the bridge's TCE table (the hypervisor thereafter adjusts mapping requests based on the DMA base address). If the corresponding adapter function presents DMA address 0x0 on the PCI bus, the PCI bridge also adjusts it to 0xK0000000 before consulting its TCE table.

Figure 4:
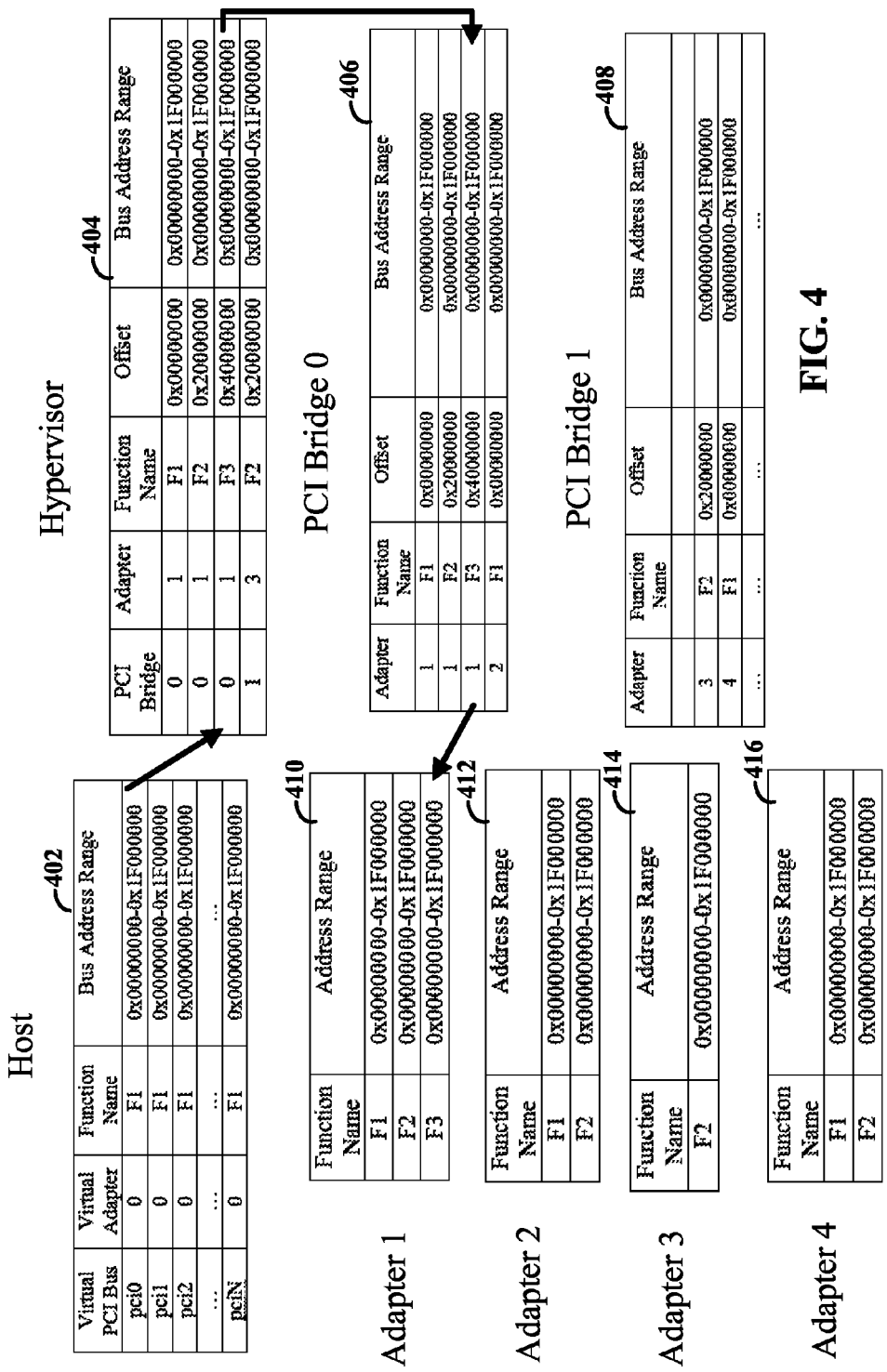
FIG. 4 shows the result of a migration of a particular VF from FIG. 3, consistent with embodiments of the present disclosure.

FIG. 4 shows the result of a migration of a particular VF from FIG. 3, consistent with embodiments of the present disclosure. FIG. 3 shows a VF that is virtually mapped to pci0. This VF initially resides on adapter 3 as function F1. FIG. 4 shows the result of a migration of this VF to adapter 1. As shown in FIG. 4, embodiments are directed toward this migration maintaining the virtual mapping shown in table 402 relative to the original mapping of table 302 and as would be seen by a device driver.

A new VF (F3) can be created on adapter 1. This results in the updating of PCI adapter tables 410, 412, 414 or 416, as necessary. For instance, VF F1 can be removed from the PCI adapter table 414, and PCI adapter table 410 can be updated to include the new VF F3. The address range for this new VF can be set to the same, common address range for the original VF (F1 on adapter 3). In this instance, the common address range is shown as 0x00000000-0x1F000000; however, other address ranges are possible. The tables 404, 406 and 408 can also each be updated accordingly. More specifically, the hypervisor table 404 can be updated to link virtual PCI bus "pci0" to PCI bridge 0, adapter 1 and VF F3. Hypervisor table 404 can also be updated with the appropriate offset (0x40000000). Similarly, the table 406 (PCI bridge 0) can be updated to indicate the appropriate adapter (1), function name (F3) and offset (0x40000000). The table 408 (PCI bridge 1) can be updated to reflect the removal of the old VF (F1 of adapter 3).

Embodiments of the present disclosure are directed toward the use of a hold-off state, or similar mechanism, to temporarily halt accesses to a VF that is undergoing migration. Once the appropriate/new mappings are in place, access can be resumed. For instance, an extended error handling (EEH) reset event can be used to halt accesses; however, the particular manner in which accesses are halted is not necessarily limited thereto.

Figure 5:
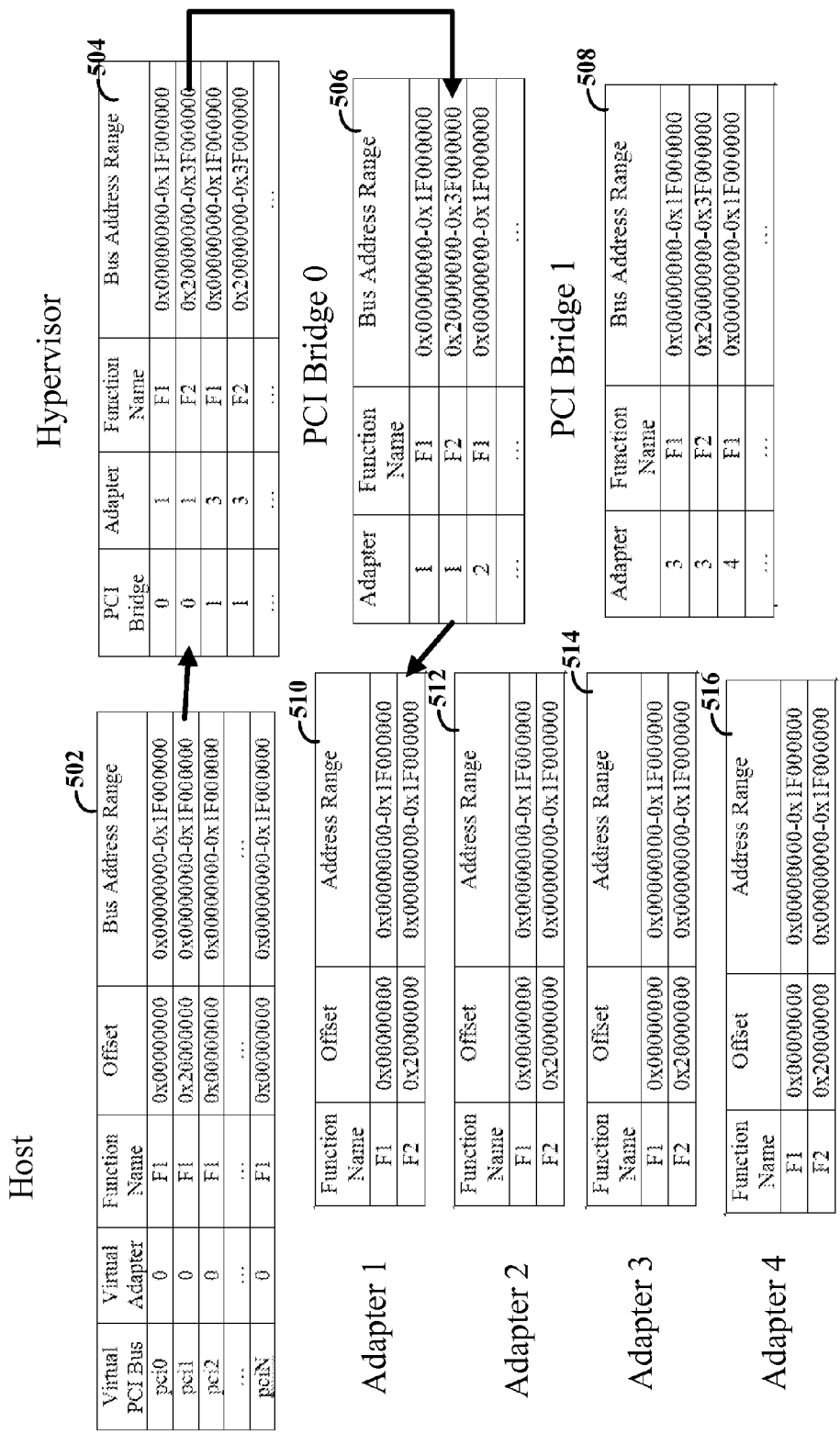
FIG. 5 depicts an address mapping, prior to migration of a VF, in which the operating system and device adapters can be used to manage offsets, consistent with embodiments of the present disclosure.

FIG. 5 depicts an address mapping, prior to migration of a function, in which the operating system and device adapters can be used to manage offsets, consistent with embodiments of the present disclosure. Similar to FIGS. 3 and 4, PCI devices/adapters can be accessed by device drivers using virtual PCI bus mapping. Thus, as shown in host table 502, the VFs can be assigned different virtual PCI busses. Hypervisor table 504 shows how these virtual PCI busses can be mapped to actual PCI busses, adapter and function names. For instance, a VF identified by virtual PCI bus "pci1" is shown as being mapped to PCI bridge 0, adapter 1 and VF F2.

PCI bridge tables 506 and 508 contain the true address space for adapters 1-4. The adapters 1-4 have corresponding tables 510, 512, 514 and 516. As shown in FIG. 5, the address offsets can be stored and managed by the host and adapters. For instance, VF F1 on virtual PCI bus "pci1" is shown has having an address offset of 0x20000000. This offset is stored in both host table 502 and adapter 1 table 510. Handling of the offset by the host can be undertaken by the particular operating system(s). Consistent therewith, various embodiments can facilitate the migration of a VF by avoiding (or lessening the amount of) reconfiguration of a corresponding device driver. Moreover, the use of offsets managed by the operating system and device adapters can be particularly useful for allowing the handling of these offsets to be offloaded from the hypervisor(s) and PCI bridge(s). If driver requests to map page 0x0 of the particular function, the operating system PCI management component can present the mapping to the hypervisor as a request to map 0x20000000. If the corresponding adapter function generates a request for 0x0, an address translation component in the adapter can adjust the address to 0x20000000 before presenting it on the PCI bus.

Figure 6:
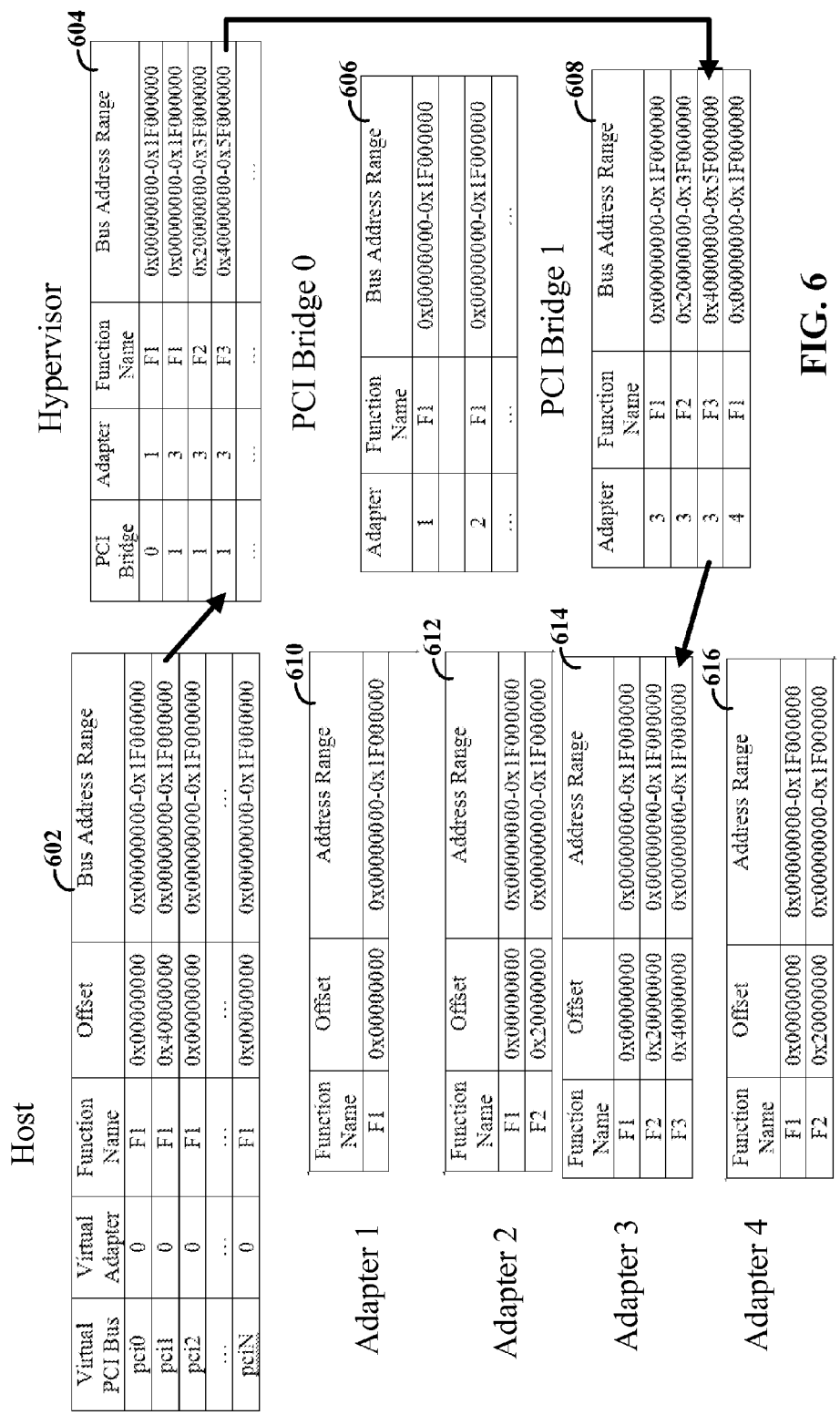
FIG. 6 shows the result of a migration of a particular VF from FIG. 5, consistent with embodiments of the present disclosure.

FIG. 6 shows the result of a migration of a particular VF from FIG. 5, consistent with embodiments of the present disclosure. FIG. 6 shows a VF that is virtually mapped to "pci1." This VF initially resides on adapter 1 as function F2. FIG. 6 shows the result of a migration of this VF to adapter 3. As discussed herein, various embodiments are directed toward this migration maintaining some (or all) of the virtual mapping relative to a device driver.

Consistent with various embodiments, a new VF (F3) can be created on adapter 3. This results in the updating of PCI adapter tables 610, 612, 614 or 616, as necessary. For instance, VF F2 can be removed from the PCI adapter table 610 and PCI adapter table 614 can be updated to include the new virtual function F3. The address range for this new VF can be set to the same, common address range for the original VF (F1 on adapter 3). In this instance, the address range is shown as 0x00000000-0x1F000000; however, other address ranges are possible. The tables 602, 604, 606 and 608 are each updated accordingly. More specifically, the host table 602 is updated to reflect the offset of the new VF, which in this case is shown as 0x40000000. The hypervisor table 604 is updated to link virtual PCI bus pci1 to PCI Bridge 1, adapter 3 and VF F3. Hypervisor table 404 can also be updated with the appropriate address range (0x40000000-0x50000000). This address range can reflect the address as modified in view of the offset and thereby represent the actual or base address for the VF. Similarly, the table 606 (PCI bridge 0) can be updated to reflect the removal of the appropriate adapter (1), function name (F2) and offset. The table 608 (PCI bridge 1) can be updated to reflect the addition of the new VF (F3 of adapter 3).

As discussed herein, the migration of a VF can be carried out using a hold off state, or similar mechanism, to temporarily halt accesses to a VF until the migration is completed. Once the appropriate mappings are in place, access can again be allowed.

Figure 7:
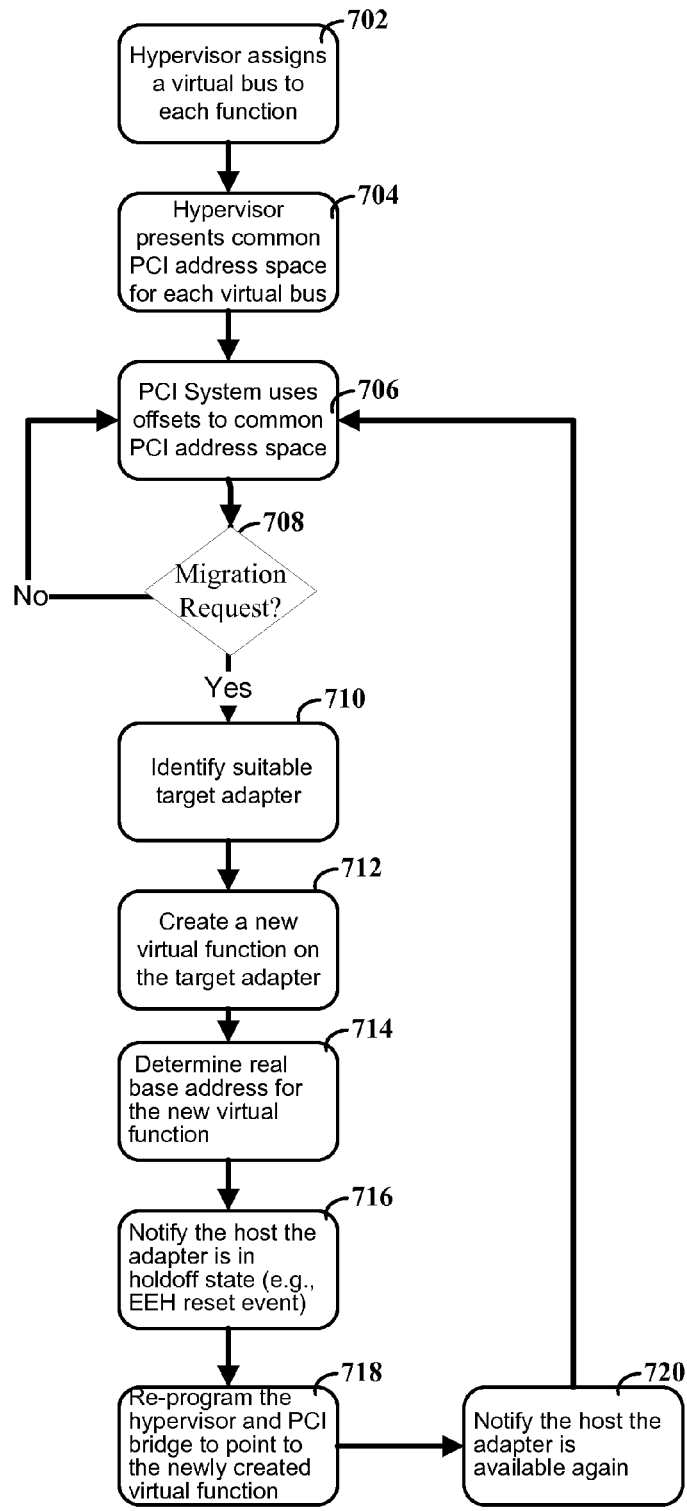
FIG. 7 depicts a flow diagram for mapping VFs and migrating VFs with offsets being handled by a hypervisor, consistent with embodiments of the present disclosure.

FIG. 7 depicts a flow diagram for mapping virtual functions and migrating virtual functions with offsets handled by a hypervisor, consistent with embodiments of the present disclosure. Consistent with the discussion of FIGS. 3 and 4, but not necessarily limited thereto, embodiments of the present disclosure contemplate address offsets being handled by a hypervisor and by PCI bridges. As shown in block 702, the hypervisor can assign a virtual bus to each VF that is a candidate for migration. Certain embodiments contemplate situations where less than all VF are assigned different virtual busses (e.g., where some VFs are not available for migration). The hypervisor can then present a common PCI address space for each VF (e.g., 0x00000000-0x1F000000), as shown in block 704. In this manner, each device driver can access the memory space corresponding VF using this common PCI address space and the virtually-assigned PCI bus.

During standard operation, the device drivers communicate to the appropriate adapters using the virtual busses and common address space. The hypervisor and PCI bridges can manage these communications using address offsets, relative to the common PCI address space and a base address for each VF, as well as a translation between the virtual PCI busses and the actual PCI mappings, as shown by block 706.

As depicted in block 708, the hypervisor can continue to manage communications in this manner until a migration request is received for one or more of the VFs. The migration request can be triggered by a variety of different events including, but not necessarily limited to, a device failure, load balancing or equipment replacement/upgrading.

Once a migration request is received, the system can identify a suitable target adapter to be the recipient of the migration request, as shown by block 710. The identification can include, but is not limited to, a selection of a PCI adapter having similar functional capabilities as the PCI adapter upon which the originating VF presently resides. This selection can include aspects such as the device manufacturer, the device I/O type or capabilities and combinations thereof. Other considerations may include physical adapter boundaries (e.g., where each physical device resides), bridge boundaries, parent bridge boundaries, power boundaries and combinations thereof. For instance, the identification of a target device may be based upon a list of devices from the same manufacturer, while also considering aspects that may affect redundancy, such as avoiding mapping of two redundant VFs to devices that rely upon the same power source.

Consistent with embodiments of the present disclosure, each adapter can present attachment identification (ID) that represents the external entity to which it is attached. For instance, the attachment ID may indicate the fabric name for Fibre Channel (FC) or the virtual local area network (VLAN) ID for Ethernet. In certain embodiments, the attachment ID could be based upon industry standards and could include transport type. This can facilitate the hypervisor obtaining information such as the vendor, model, etc., for each adapter. The hypervisor can use information from the attachment ID to manage virtual function migration by identifying adapters of a similar type. The attachment ID can also be used to verify that the connectivity is suitable. For instance, the attachment ID may be used to ensure that a VF will retain access to a required disk storage device after a migration.

Aspects of the present disclosure are directed toward the ability to present individuals (e.g., an administrator) with an option for identifying and selecting groups of PCI adapters that are candidates for VF migration between themselves. This selection can then be used in place of, or in conjunction with, an automated discovery and identification solutions.

As shown by block 712, the system can then create a new VF on the identified target adapter. The system can then determine the actual base address for the newly-created VF, as shown by block 714. For instance, the actual base address can be obtained from the next available address range for the target adapter. Consistent with embodiments, the determination can be made by accessing the corresponding PCI bridge.

As show in block 716, the system can then halt accesses to the VF that is to be migrated. For instance, the host and its device driver can be notified that the VF is in hold-off state using an EEH reset event.

Block 718 shows that the system can reprogram the hypervisor and PCI bridge to point to the newly-created VF. Consistent with embodiments of the present disclosure, this can include programming the corresponding PCI bridge to associate the new base address with the new adapter and its new function. This reprogramming can also include programming the hypervisor so that the current virtual PCI bus and adapter now refer to the new bridge, adapter, function, and base address. In particular, the PCI Bridge and hypervisor can be programmed to include adapter, function name, offset and bus address range. The hypervisor can also be programmed to associate the virtual PCI bus of the original VF to that of the newly-created VF. The system can then notify the host that the adapter is available again, per block 720. The system can then resume accesses to the newly created VF, as shown by block 706.

Figure 8:
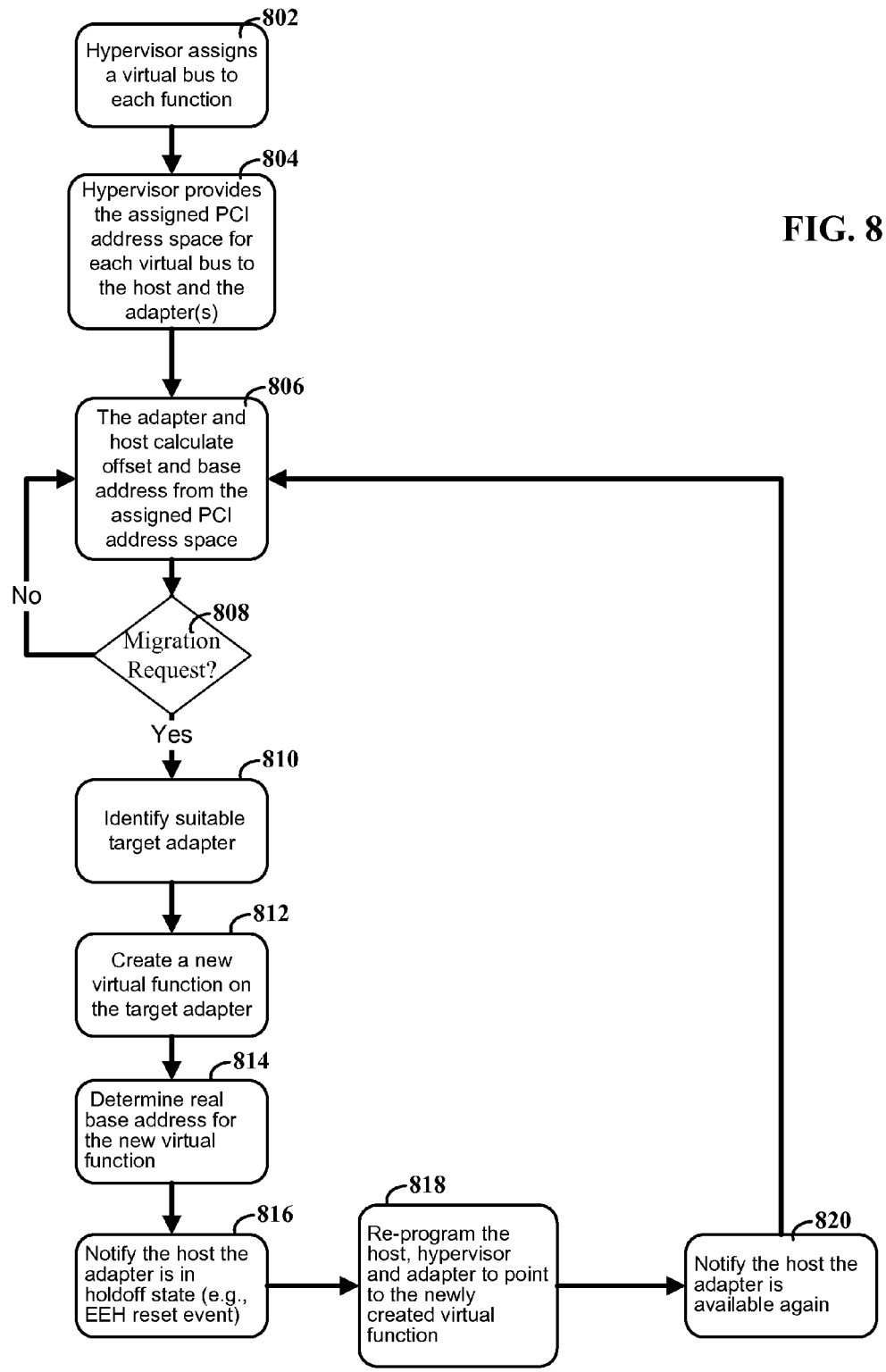
FIG. 8 depicts a flow diagram for mapping VFs and migrating VFs with offsets being handled by a host and by device adapters, consistent with embodiments of the present disclosure.

FIG. 8 depicts a flow diagram for mapping virtual functions and migrating virtual functions with offsets handled by a host and by device adapters, consistent with embodiments of the present disclosure. Consistent with the discussion of FIGS. 5 and 6, but not necessarily limited thereto, embodiments of the present disclosure contemplate address offsets that are handled by operation systems and device adapters. As shown in block 802, the hypervisor can assign a virtual bus to each VF that is a candidate for migration. Certain embodiments contemplate situations where less than all of the VFs are assigned different virtual busses. As viewed by a device driver, a common PCI address space is used for each VF and its corresponding virtual PCI bus (e.g., 0x00000000-0x1F000000). The host operating systems and the device adapter(s) are presented with this address, as shown by block 804. The host and device adapters also use a corresponding offset to map accesses to the common address space to the correct location in main memory.

During standard operation, the device drivers communicate to the appropriate adapters using the virtual busses and common address space. The adapter and host operating system, manage these communications using address offsets, relative to the common PCI address space and a base address for each VF as shown by block 806. As discussed herein, the hypervisor can manage a translation between the virtual PCI busses and the actual PCI busses and device mappings.

As depicted in block 808, communications can continue in this manner until a migration request is received for one or more of the VFs. As discussed herein, the migration request can be triggered by a variety of different events.

Once a migration request is received, the system can identify a suitable target adapter to be the recipient of the migration request, as shown by block 810. As discussed herein, the identification can include, but is not limited to, a selection of a PCI adapter having similar functional capabilities as the PCI adapter upon which the originating VF presently resides.

As shown by block 812, the system can then create a new VF on the identified target adapter. The system can then determine the actual base address for the newly-created VF, as shown by block 814. For instance, the actual base address can be obtained from the next available address range for the target adapter. Consistent with embodiments, the determination can be made by accessing the corresponding PCI Bridge.

As show in block 816, the system can then halt accesses to the VF that is to be migrated. For instance, the host and its device driver can be notified that the VF is in hold-off state using an EEH reset event.

Block 818 shows that the system can reprogram the host, hypervisor, PCI bridge and adapter to point to the newly-created VF. Consistent with embodiments of the present disclosure, this can include programming the corresponding PCI bridge to associate the new base address with the adapter and new function. This reprogramming can also include programming the hypervisor so that the current virtual PCI bus and adapter now refer to the new bridge, adapter, function, and base address. In particular, the PCI bridge and hypervisor can be programmed to include adapter, function name and bus address range. The hypervisor can also be programmed to associate the virtual PCI bus of the original VF to that of the newly-created VF. Moreover, the host and adapter can be programmed with the appropriate address offset. The system can then notify the host that the adapter is available again, per block 820. The system can then resume accesses to the newly created VF, as shown by block 806.

Aspects of the present disclosure are directed toward grouping of similar VFs to create a set of migration VFs. For instance, whenever a VF is selected for migration a lookup table can be consulted to identify other VFs for migration. The system can move each identified VF of the group in response to an initial migration request. For instance, when a VF for a particular device adapter is moved, all other VFs on that adapter might also be moved. In another instance, when a VF for a particular I/O device (e.g., for a particular a storage system) is moved, VFs for that particular I/O device might also be moved. Other groupings are also possible depending upon the particulars of the system and its use.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present disclosure may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A system comprising:
a main memory;
a plurality of Peripheral Component Interconnect (PCI) adapter devices having virtual functions with direct memory access (DMA) capabilities to the main memory, wherein at least one of the plurality of Peripheral Component Interconnect (PCI) adapter devices has at least two of the virtual functions;
a plurality of PCI Bridges that provide corresponding real PCI busses upon which the plurality of PCI adapter devices reside, the real PCI busses having real PCI bus numbers;
a plurality of virtual machines each having one or more device drivers configured to manage access to the virtual functions using
  a separate and different virtual PCI bus for each of the virtual functions, and
  a common address range for each of the virtual functions;
one or more hypervisors configured to translate the separate and different virtual PCI busses to the real PCI bus numbers; and
a memory storing offset values relative to the common address range and a mapping of each virtual function to a distinct location in the main memory; and wherein the one or more hypervisors are configured to:
notify at least one of the device drivers that one of the virtual function is in a hold state:
modify, for the one virtual function, an offset value in the memory; and
notify the at least one of the device drivers that the hold state has been lifted.

2. The system of claim 1, wherein the memory storing offset values resides in the hypervisor.

3. The system of claim 2, further including another memory, also storing the offset values, within the PCI Bridges.

4. The system of claim 1, wherein memory storing offset values resides in an operating system of the virtual machines.

5. The system of claim 4, further including another memory, also storing the offset values, within the PCI adapter devices.

6. A system for migration of a first virtual function of a f11'St device located on a Peripheral Component Interconnect (PCI) bus within a PCI structure and accessible by a device driver using a virtual address of the first device, the system comprising:
a computer processor designed to:
  create a second virtual function on a second device;
  determine a base address for the second virtual function as a function of a logical location of the second device within the PCI structure;
  determine an offset for the second virtual function as a function of the base address and the virtual address of the first device;
  notify the device driver that the first virtual function is on hold;
  store the offset in a translation table;
  notify the device driver that the hold has been lifted; and
  route accesses to the virtual address of the first device and by the device driver to memory of the second virtual function in response to the offset in the translation table.

7. The system of claim 6, wherein the computer processor is further configured to route accesses to the virtual address by routing direct memory accesses to a main memory based upon the offset in the translation table.

8. The system of claim 6, further comprising a hypervisor configured to access the translation table in response to accesses requests for virtual functions.

9. The system of claim 6, further comprising first host having a first operating system that is configured to access the first translation table and wherein the second device is configured to access a second translation table that also includes the offset.

10. The system of claim 6, wherein the computer processor is further configured to identify the second virtual function as a function of characteristics of the first virtual function.

11. The system of claim 10, wherein the characteristics include one or more from a list consisting essentially of a device manufacturer, a device I/O type, physical adapter boundaries, bridge boundaries, parent bridge boundaries, power boundaries and combinations thereof.

* * * * *